US008811944B2

(12) United States Patent
Celi, Jr. et al.

(10) Patent No.: US 8,811,944 B2
(45) Date of Patent: *Aug. 19, 2014

(54) AUTHENTICATION REQUEST MANAGEMENT

(75) Inventors: Joseph Celi, Jr., Boca Raton, FL (US); Mark McGloin, Killiney (IE); Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,383

(22) Filed: Sep. 11, 2012

(65) Prior Publication Data

US 2013/0324086 A1    Dec. 5, 2013

Related U.S. Application Data

(63) Continuation of application No. 13/483,662, filed on May 30, 2012.

(51) Int. Cl.
*H04M 1/66* (2006.01)
*H04M 1/68* (2006.01)
*H04M 3/16* (2006.01)

(52) U.S. Cl.
USPC ............................................ 455/410; 705/44

(58) Field of Classification Search
USPC .................... 455/410, 411; 705/44
See application file for complete search history.

(56) References Cited

U.S. PATENT DOCUMENTS

| | | | | |
|---|---|---|---|---|
| 6,219,702 | B1 * | 4/2001 | Ikehara et al. | 709/224 |
| 8,151,328 | B1 * | 4/2012 | Lundy et al. | 726/5 |
| 2003/0128822 | A1 * | 7/2003 | Leivo et al. | 379/93.02 |
| 2003/0212887 | A1 * | 11/2003 | Walther et al. | 713/151 |
| 2004/0174965 | A1 * | 9/2004 | Brahm et al. | 379/88.19 |
| 2008/0046366 | A1 * | 2/2008 | Bemmel et al. | 705/44 |
| 2009/0132813 | A1 | 5/2009 | Schibuk | |
| 2009/0248883 | A1 | 10/2009 | Suryanarayana et al. | |
| 2010/0107229 | A1 | 4/2010 | Najafi et al. | |
| 2011/0086614 | A1 | 4/2011 | Brisebois et al. | |

FOREIGN PATENT DOCUMENTS

WO    2010127365 A1    11/2010

OTHER PUBLICATIONS

USPTO Office Action, U.S. Appl. No. 13/483,662, Jan. 2, 2013, 9 pages.
USPTO Office Action, U.S. Appl. No. 13/483,662, Jul. 12, 2013, 20 pages.

(Continued)

*Primary Examiner* — Vladimir Magloire
(74) *Attorney, Agent, or Firm* — Yee & Associates, P.C.; Jeffrey S. LaBaw

(57) ABSTRACT

The different illustrative embodiments provide a method, computer program product, and apparatus for managing an authentication request. A determination is made whether additional authentication is to be performed responsive to receiving the authentication request to access an application from a mobile device. A phone number to call is sent to the mobile device responsive to a determination that the additional authentication is to be performed. A determination is made whether an incoming call to the phone number is from the mobile device and within a selected period of time. The authentication request to access the application from the mobile device is granted responsive to a determination that the incoming call to the phone number is from the mobile device and within the selected period of time.

15 Claims, 7 Drawing Sheets

FIG. 5

(56) References Cited

OTHER PUBLICATIONS

Mell et al., "The NIST Definition of Cloud Computing (Draft)", National Institute of Standards and Technology, U.S. Department of Commerce, Special Publication No. 800-145, Jan. 2011, 7 pages.

Celi Jr et al., "Authentication Request Management", U.S. Appl. No. 13/483,662, filed with U.S. Patent and Trademark Office on May 30, 2012, 43 pages.

Preliminary Amendment dated Sep. 12, 2012 for U.S. Appl. No. 13/483,662, 6 pages.

* cited by examiner

AUTHENTICATION REQUEST MANAGEMENT

CROSS-REFERENCE TO RELATED APPLICATION(S)

This application is a Continuation of and claims the benefit of priority to U.S. patent application Ser. No. 13/483,662, filed on May 30, 2012 and entitled "Authentication Request Management," the contents of which are hereby incorporated by reference.

BACKGROUND

1. Field

The disclosure relates generally to an improved data processing system and more specifically to authentication in an improved data processing system. Even more specifically, the disclosure relates to a method, computer program product, and apparatus for managing an authentication request.

2. Description of the Related Art

Computer systems commonly allow users to access resources that are accessible to the computer system. In some examples, the resources are confidential. It may also be desirable to limit access to these resources to specific users. For example, a computer system may allow users to access personnel records that include confidential information. Confidential information is data that is intended to be known only to an individual and/or parties trusted by the individual. For example, confidential information may be a social security number.

To allow only authorized users to access the confidential information or resources, users are authenticated before being allowed to access the confidential resources. Authentication means that the identity of the user requesting access to confidential information or resources is verified by a computer system. For example, the user may be issued login credentials. Login credentials are a user name and/or password for using the computer system in these illustrative examples. The user prevents other people from accessing the confidential information or resources by keeping the login credentials private. In other words, the user does not allow other users to know the login credentials issued to the user.

A mobile device is a computer system that is configured to be transported with the user and has an assigned telephone number on a telephone network. The mobile device may have fewer components or functions than a computer system that is in the form of a desktop or laptop computer. For example, mobile devices include wireless phones that are configured to communicate on both telephone networks and data networks, such as the Internet. Mobile devices may be configured to connect to an application running on another computer system. The mobile device may use a network, such as an Internet protocol network to connect to the other computer system and access the application.

The mobile device connects to the computer system running the application the user of the mobile device desires to access. The computer system running the application uses login credentials received from the mobile device to verify the identity of the user of the mobile device.

SUMMARY

The different illustrative embodiments provide a method, computer program product, and apparatus for managing an authentication request. A determination is made whether additional authentication is to be performed responsive to receiving the authentication request to access an application from a mobile device. A phone number to call is sent to the mobile device responsive to a determination that the additional authentication is to be performed. A determination is made whether an incoming call to the phone number is from the mobile device and within a selected period of time. The authentication request to access the application from the mobile device is granted responsive to a determination that the incoming call to the phone number is from the mobile device and within the selected period of time.

DETAILED DESCRIPTION

Figure 1:
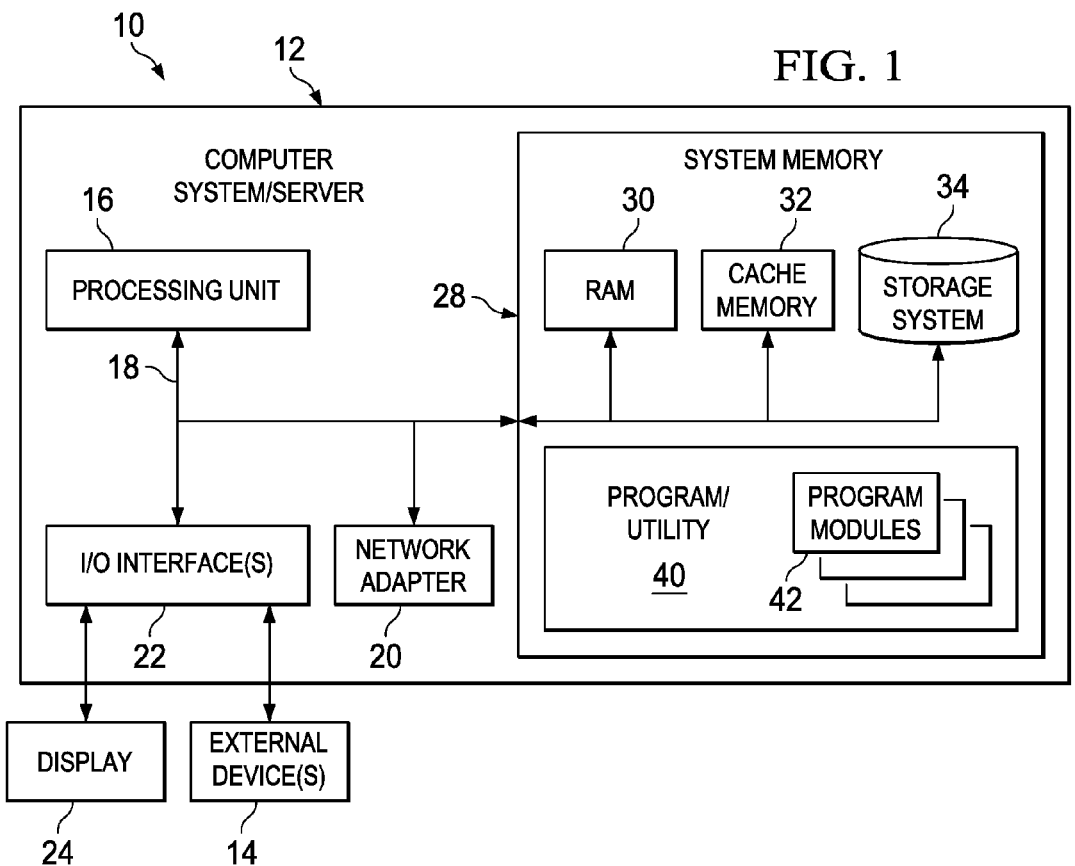
FIG. 1 is an illustration of an example of a cloud computing node in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the detailed description includes the following definitions which have been derived from the "Draft NIST Working Definition of Cloud Computing" by Peter Mell and Tim Grance, dated Oct. 7, 2009, which is cited in an IDS filed herewith and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which can include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, an illustration of an example of a cloud computing node is depicted in accordance with an illustrative embodiment. Cloud computing node 10 is only one example of a suitable cloud computing node and is not intended to suggest any limitation as to the scope of use or functionality of the illustrative embodiments. Regardless, cloud computing node 10 is capable of being implemented and/or performing any of the functionality set forth hereinabove.

In cloud computing node 10 there is computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices and the like.

Computer system/server 12 may be described in the general context of computer system-executable instructions, such as program modules being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing unit 16, system memory 28, and bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12 and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of the illustrative embodiments.

Program/utility 40, having a set (at least one) of program modules 42, may be stored in system memory 28 by way of example and not limitation as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of the illustrative embodiments.

Computer system/server 12 may also communicate with one or more external devices 14, such as a keyboard, a pointing device, display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to, microcode, device drivers, redundant processing units, external disk drive arrays, RAID systems, tape drives, and data archival storage systems, etc.

Figure 2:
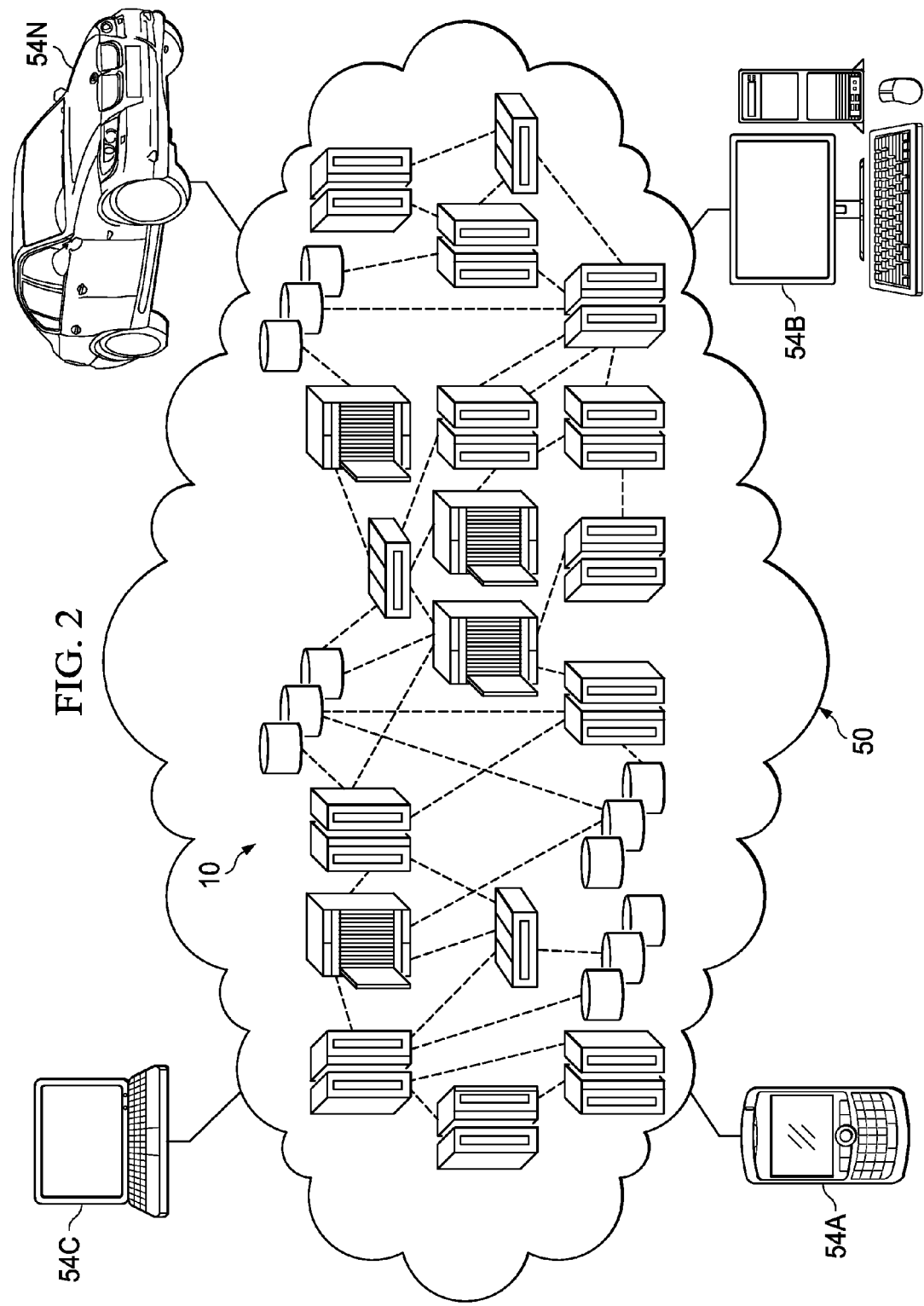
FIG. 2 is an illustration of an example of a cloud computing environment in accordance with an illustrative embodiment.

Referring now to FIG. 2, an illustration of an example of a cloud computing environment is depicted in accordance with an illustrative embodiment. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices shown in FIG. 2 are intended to be illustrative only and that cloud computing nodes 10 and cloud computing environment 50 can communicate with any type of computerized device over any type of network and/or network addressable connection (e.g., using a web browser).

Figure 3:
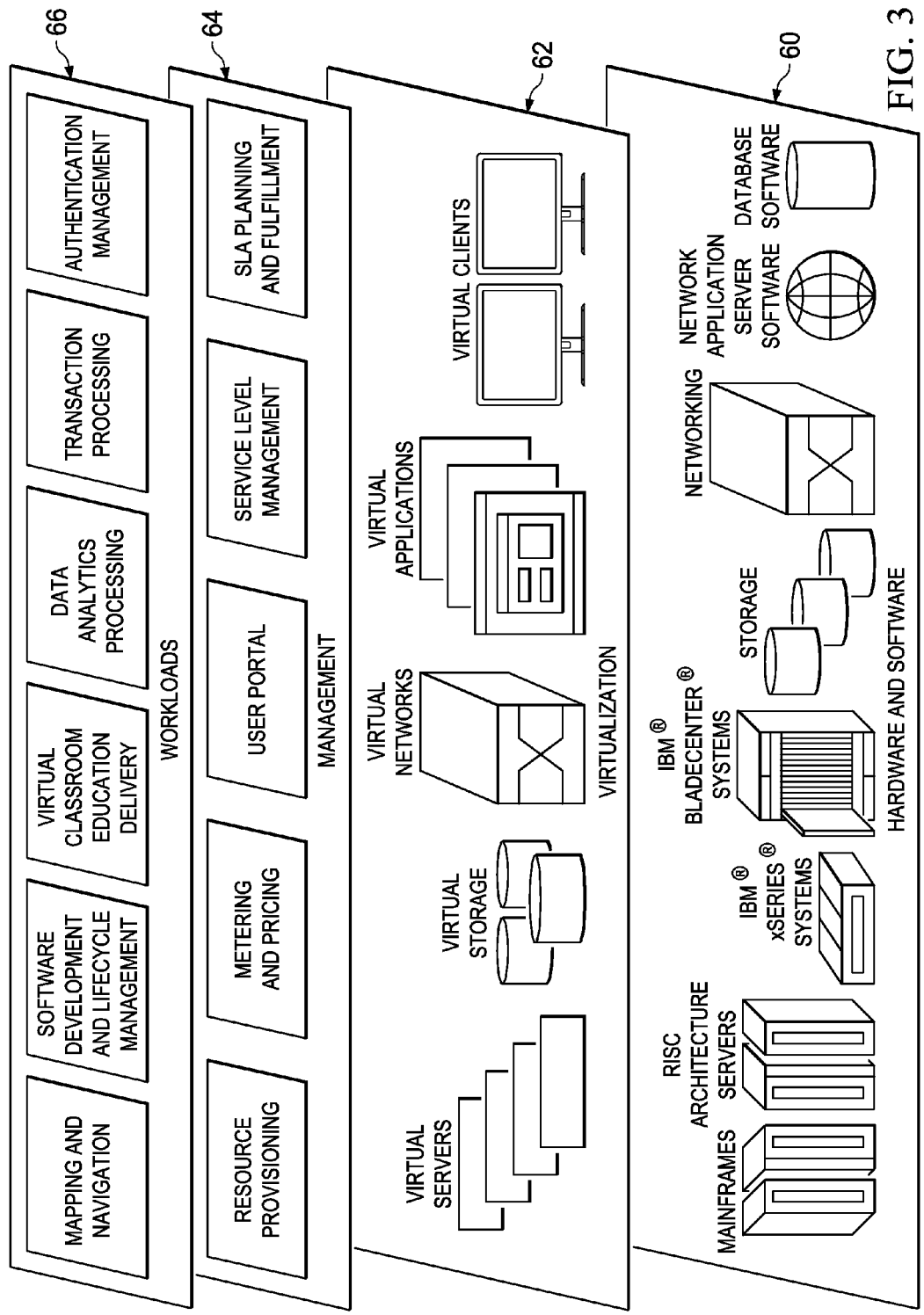
FIG. 3 is an illustration of a set of functional abstraction layers provided by a cloud computing environment in accordance with an illustrative embodiment.

Referring now to FIG. 3, an illustration of a set of functional abstraction layers provided by a cloud computing environment is depicted in accordance with an illustrative embodiment. It should be understood in advance that the components, layers, and functions shown in FIG. 3 are intended to be illustrative only and are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and authentication management. For example, workloads layer 66 may be implemented by authentication management process 412 in FIG. 4.

The different illustrative embodiments recognize and take into account a number of different considerations. For example, the different illustrative embodiments recognize and take into account that the login credentials for a user may be received by an unauthorized party. In one illustrative example, an unauthorized party may receive of the login credentials for a user by communicating with the user electronically and claiming to be an authorized party to receive the login credentials. In another illustrative example, the unauthorized party may access the mobile device of the user without the knowledge of the user to access the login credentials of the user. The unauthorized party may then attempt to use another device to access the cloud application.

The different illustrative embodiments also recognize and take into account that an administrator of a cloud application may desire to restrict access to the cloud application to only particular mobile devices. For example, the administrator may desire to restrict access to the cloud application to a mobile device associated with a particular user. In such an illustrative example, the user may not access the cloud application from a different mobile device because an authentication management process would not validate the identity of the different mobile device.

Thus, the different illustrative embodiments provide a method, computer program product, and apparatus for managing an authentication request. A determination is made whether additional authentication is to be performed responsive to receiving the authentication request to access an application from a mobile device. A phone number to call is sent to the mobile device responsive to a determination that the additional authentication is to be performed. A determination is made whether an incoming call to the phone number is from the mobile device and within the selected period of time. The authentication request to access the application from the mobile device is granted responsive to a determination that the incoming call to the phone number is from the mobile device and within the selected period of time.

Figure 4:
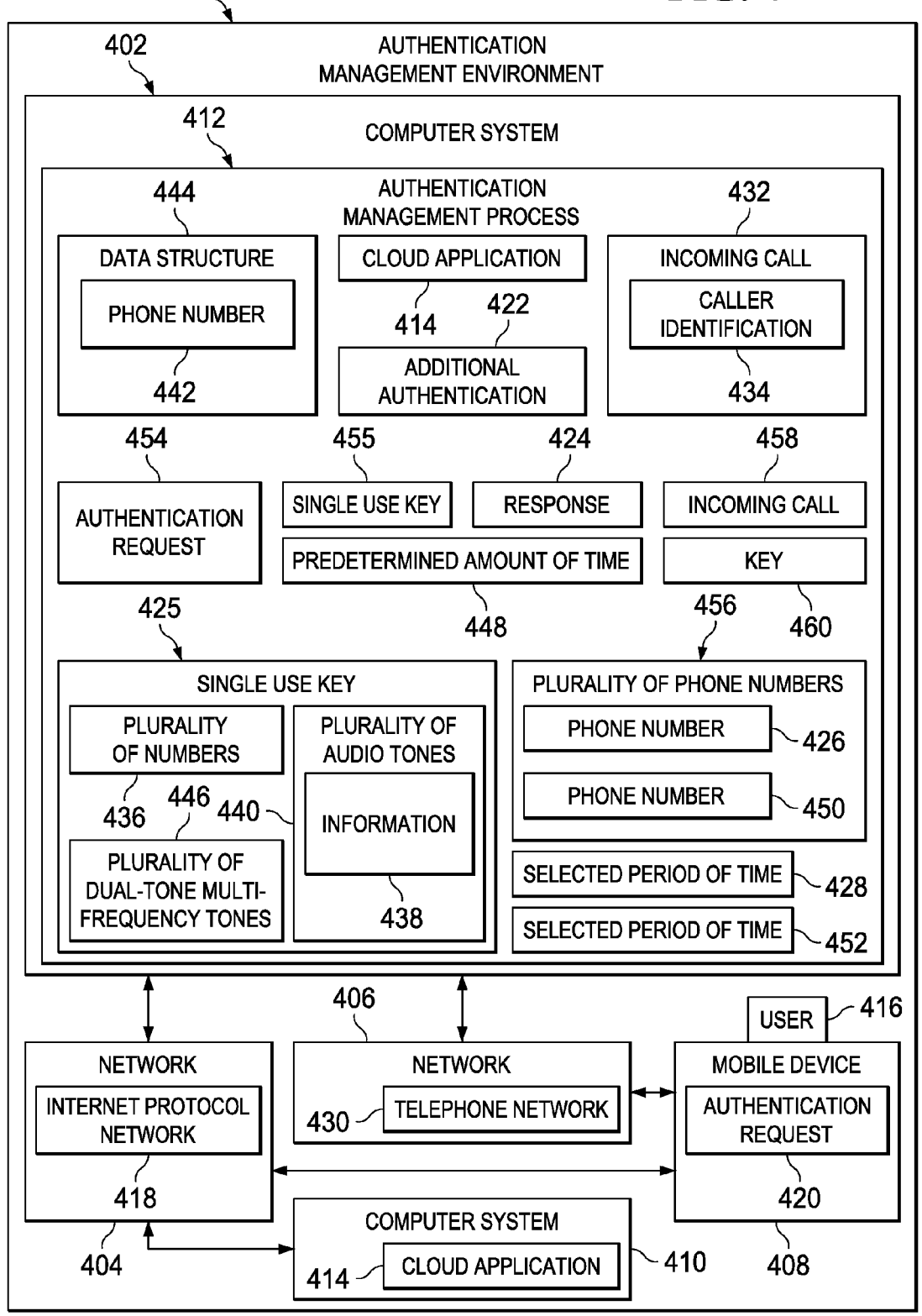
FIG. 4 is an illustration of an authentication management environment in accordance with an illustrative embodiment.

Turning now to FIG. 4, an illustration of an authentication management environment is depicted in accordance with an illustrative embodiment. Authentication management environment 400 is an example of an environment in which illustrative embodiments may be implemented. In these illustrative examples, authentication management environment 400 contains computer system 402, network 404, network 406, mobile device 408, and computer system 410.

Computer system 402 runs authentication management process 412. Computer system 402 is an example implementation of computer system/server 12 in FIG. 1. Computer system 402 may also be a cloud computing node, such as cloud computing node 10 in FIG. 1. In these illustrative examples, authentication management process 412 is cloud application 414. Cloud application 414 is an example of functionality for which a cloud computing environment is utilized, such as the workloads in workloads layer 66 in FIG. 3. For example, cloud application 414 may be a customer relationship manager application in some illustrative embodiments.

In this illustrative embodiment, user 416 of mobile device 408 desires to connect to cloud application 414 using network 404. In these illustrative examples, network 404 is Internet protocol network 418. In order to connect to cloud application 414, user 416 causes mobile device 408 to generate authentication request 420. Authentication request 420 includes login credentials issued to user 416 in these illustrative examples. For example, authentication request 420 may include a user name and/or password of user 416.

Mobile device 408 sends authentication request 420 to authentication management process 412 running on computer system 402 using network 404. Authentication management process 412 receives authentication request 420 and determines whether additional authentication 422 is to be performed. Additional authentication 422 is a process of verifying the identity of user 416 and/or mobile device 408. Authentication management process 412 also determines whether additional authentication 422 is to be performed based on a policy. The policy may include criteria for determining whether additional authentication 422 is to be performed by authentication management process 412. For example, additional authentication 422 may be performed when mobile device 408 has not previously accessed cloud application 414, when mobile device 408 has not accessed cloud application 414 in a predetermined amount of time, when the login credentials of user 416 are incorrectly entered more than a threshold number of times, or other suitable criteria.

Once authentication management process 412 determines that additional authentication 422 is to be performed for authentication request 420, authentication management process 412 generates response 424. Response 424 is a message from authentication management process 412 to mobile device 408 that is sent using network 404.

Response 424 includes phone number 426 in these illustrative examples. In some illustrative embodiments, response 424 also includes selected period of time 428. Phone number 426 is a sequence of numbers for connecting to computer system 402 on network 406. More specifically, network 406 is telephone network 430, and phone number 426 is an identifying number for connecting to computer system 402 on telephone network 430. Telephone network 430 includes the public switched telephone network (PTSN) and cellular telephone networks in the illustrative examples. Phone number 426 is included in response 424 to indicate to mobile device 408 that mobile device 408 is to initiate a call with computer system 402 on network 406.

In other illustrative embodiments, response 424 includes additional elements and/or different elements. Response 424 includes an identifier for computer system 402 to indicate to mobile device 408 which computer system is to be called by mobile device 408. The identifier may also be an identifier corresponding to an entry in a contact list stored on mobile device 408. For example, a contact list on mobile device 408 may contain phone numbers with an identifier associated with each phone number. In such an illustrative example, response 424 includes an identifier in the contact list such that mobile device 408 may identify the phone number that corresponds to the identifier in the contact list. In yet other illustrative embodiments, phone number 426 is not included in response 424, and mobile device 408 uses a predetermined phone number or a phone number in a contact list to call computer system 402.

Selected period of time 428 is included in response 424 to indicate to mobile device 408 the time period in which mobile device 408 is to call computer system 402.

In some illustrative examples, response 424 also includes single use key 425. Single use key 425 is additional information that mobile device 408 is to provide to authentication management process 412 to verify that mobile device 408 generated authentication request 420. In one illustrative embodiment, single use key 425 is plurality of numbers 436. In another illustrative embodiment, single use key 425 is information 438 about plurality of audio tones 440. Information 438 may include an identification of a plurality of notes and/or an identification of the plurality of frequencies and/or amplitudes.

Mobile device 408 receives response 424 using network 404. Mobile device 408 then initiates a call with computer system 402 using network 406. Authentication management process 412 receives the call from mobile device 408 as incoming call 432. Authentication management process 412 then identifies caller identification 434. Caller identification 434 is information from network 406 about the caller that initiated incoming call 432. In these illustrative embodiments, caller identification 434 is the phone number associated with mobile device 408 and/or the telephone line which mobile device 408 used to initiate incoming call 432.

Authentication management process 412 then identifies phone number 442 associated with mobile device 408 in data structure 444. Data structure 444 is a collection of information about mobile devices and/or users that are authorized to access cloud application 414. In this illustrative example, data structure 444 includes phone number 442 associated with mobile device 408. In other illustrative embodiments, the phone numbers in data structure 444 may be associated with particular users and/or login credentials. In the event that caller identification 434 does not match phone number 442, authentication management process 412 denies access to cloud application 414. Authentication management process 412 may also store information about mobile device 408 as a potentially unauthorized device.

In the event that caller identification 434 matches phone number 442, authentication management process 412 waits to receive single use key 425 from mobile device 408. In illustrative embodiments in which single use key 425 is plurality of numbers 436, mobile device 408 generates plurality of dual-tone multi-frequency tones 446. Plurality of dual-tone multi-frequency tones 446 are the tones that represent plurality of numbers 436 in the collection of dual-tone multi-frequency tones. For example, plurality of numbers 436 may include "5107." In such an illustrative example, mobile device 408 generates plurality of dual-tone multi-frequency tones 446 corresponding to the numbers "5107." In illustrative embodiments in which single use key 425 is plurality of audio tones 440, mobile device 408 generates plurality of audio tones 440 on an audio channel in incoming call 432.

Authentication management process 412 then determines whether the key provided by mobile device 408 corresponds to single use key 425. In other words, authentication management process 412 determines whether the key provided by mobile device 408 in incoming call 432 is the same key as single use key 425 provided to mobile device 408 using network 404. In the event that the key provided by mobile device 408 corresponds to single use key 425, authentication management process 412 allows user 416 to access cloud application 414 using mobile device 408.

In some illustrative embodiments, access to cloud application 414 is granted for predetermined amount of time 448. For example, predetermined amount of time 448 may be about one week. In such an illustrative embodiment, authentication management process 412 identifies that predetermined amount of time 448 has elapsed since mobile device 408 was authenticated and sends a message to mobile device 408 using network 404 that mobile device 408 is to generate authentication request 454. Authentication request 454 is an additional request by mobile device 408 to access cloud application 414.

Upon receiving authentication request 454, authentication management process 412 determines that additional authentication 422 is to be performed again. Authentication management process 412 sends phone number 450, selected period of time 452, and single use key 455 to mobile device 408 using network 404. Phone number 450 is another number in plurality of phone numbers 456 on which calls may be received by authentication management process 412 running on computer system 402. Phone number 450 may be the same as phone number 426 or different than phone number 426. Likewise, selected period of time 452 is the amount of time in which mobile device 408 is to call authentication management process 412 using network 406. Selected period of time 452 may be the same amount of time as selected period of time 428 or a different amount of time. Single use key 455 may be in the same format as single use key 425 but has a different value. For example, single use key 425 may include numbers for which mobile device 408 generates corresponding dual-tone multi-frequency tones. However, the numbers differ between single use key 425 and single use key 455, since single use key 425 is not reused for mobile device 408.

Mobile device 408 contacts authentication management process 412 using network 406 to form incoming call 458. Incoming call 458 is a call received from mobile device 408 using network 406. In some illustrative embodiments, authentication management process 412 then identifies caller identification information for incoming call 458. When the caller identification information for incoming call 458 indicates that incoming call 458 was initiated by mobile device 408, mobile device 408 provides the key received as single use key 425 in the requested form. For example, mobile device 408 may generate dual-tone multi-frequency tones corresponding to a plurality of numbers when single use key 455 is a plurality of numbers.

When authentication management process 412 receives the key that corresponds to single use key 455, authentication management process 412 allows access to cloud application 414. In some illustrative embodiments, cloud application 414 is also running on computer system 410. In such an illustrative embodiment, authentication management process 412 directs mobile device 408 to access cloud application 414 by connecting to computer system 410 using network 404. Authentication management process 412 sends key 460 to mobile device 408 for sending to computer system 410. Key 460 is data that verifies that mobile device 408 was authenticated by authenticated management process 412. Key 460 may be digitally signed by authentication management process 412 in some illustrative embodiments. Mobile device 408 sends key 460 to computer system 410 with a request to access cloud application 414. Responsive to computer system 410 verifying the digital signature on key 460 that was generated by authentication management process 412, computer system 410 allows mobile device 408 to access cloud application 414.

The illustration of computer system 402 in authentication management environment 400 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, incoming call 458 may be received by another computer system, such as computer system 410. In such an illustrative embodiment, the other computer system may identify whether caller identification 434 is the same as phone number 442 in data structure 444. In yet other illustrative embodiments, the other computer system, such as computer system 410, may send caller identification 434 to authentication management process 412 using network 404 such that authentication management environment 400 determines whether caller identification 434 is the same as phone number 442. In yet other illustrative embodiments, selected period of time 428 is included in response 424. In such illustrative embodiments, authentication management process 412 determines whether mobile device 408 calls computer system 402 within selected period of time 428 of sending response 424.

Figure 5:
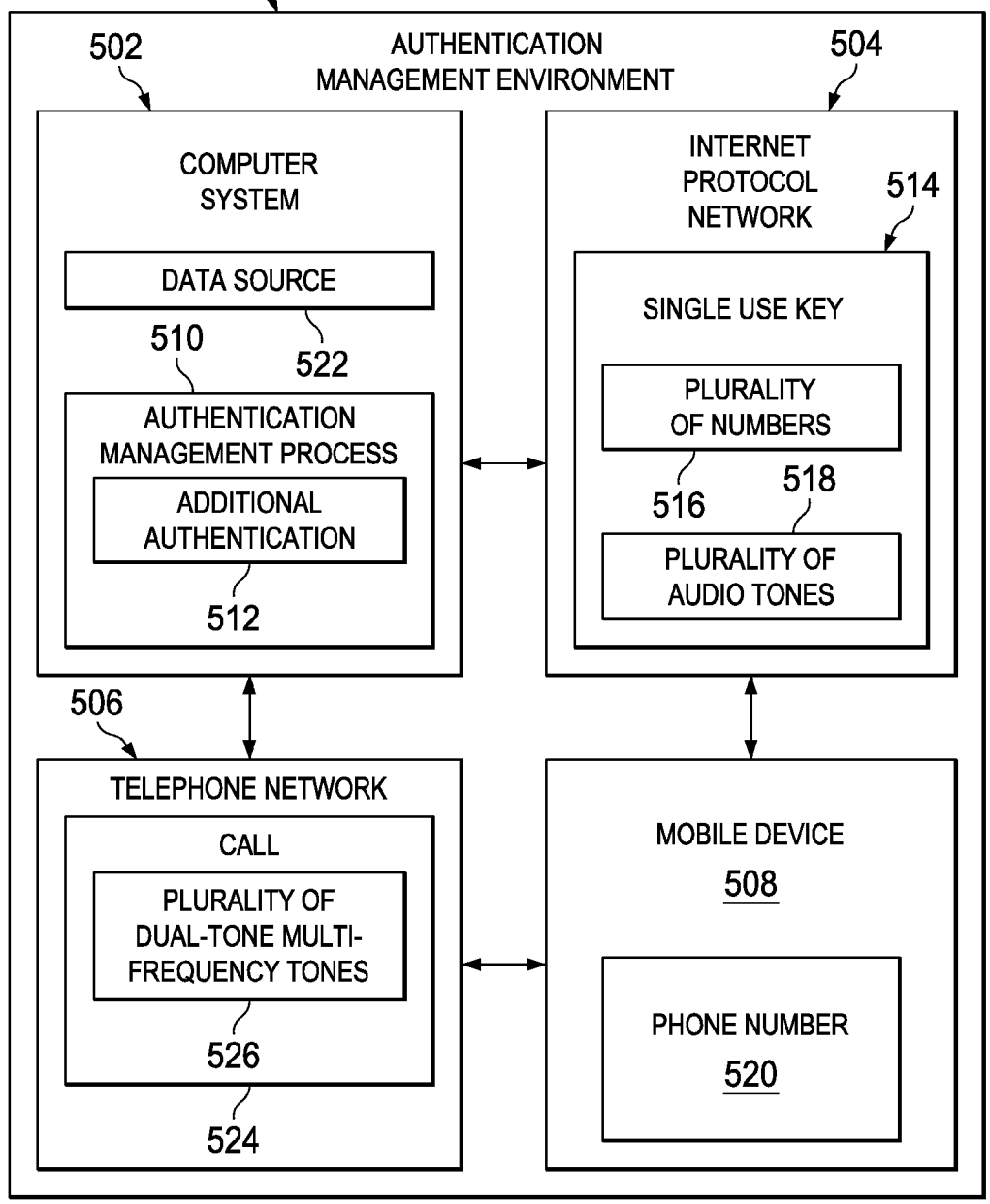
FIG. 5 is an additional illustration of an authentication management environment in accordance with an illustrative embodiment.

With reference now to FIG. 5, an additional illustration of an authentication management environment is depicted in accordance with an illustrative embodiment. Authentication management environment 500 is an example of an environment in which illustrative embodiments may be implemented.

Authentication management environment 500 includes computer system 502, Internet protocol network 504, telephone network 506, and mobile device 508. Computer system 502 is an example of computer system 12 in FIG. 1. Computer system 502 runs authentication management process 510. Authentication management process 510 performs authentication of mobile device 508 to access a cloud application, such as cloud application 414 in FIG. 4.

Mobile device 508 generates an authentication request, such as authentication request 420 in FIG. 4 to verify the identity of the user of mobile device 508. The user of mobile device 508 desires to access the cloud application running on computer system 502. Mobile device 508 is configured to generate and send the authentication request using Internet protocol network 504 without input from the user. Internet protocol network 504 is a network in which communications that travel across the network are in the form of protocols. For example, the protocols may include transmission control protocol/Internet protocol (TCP/IP). In one illustrative embodiment, mobile device 508 does not present an indication that an authentication request is being generated or sent.

Authentication management process 510 receives the authentication request and determines whether additional authentication 512 is to be performed. Authentication management process 510 uses a policy and/or a set of rules in some illustrative embodiments to determine whether additional authentication 512 is to be performed.

In the event that authentication management process 510 determines that additional authentication 512 is to be performed, authentication management process 510 generates single use key 514. Single use key 514 is a key like single use key 425 in FIG. 4. Single use key 514 may be in the form of plurality of numbers 516, plurality of audio tones 518, or another suitable key. Authentication management process 510 then sends single use key 514 to mobile device 508 using Internet protocol network 504.

Authentication management process 510 identifies phone number 520 in data source 522 accessible to authentication management process 510. Phone number 520 is the phone number associated with mobile device 508 in data source 522. Phone number 520 may be stored in data source 522 by an administrator or a process that provisions access to the cloud application in some illustrative embodiments.

Once authentication management process 510 identifies phone number 520, authentication management process 510 uses telephone network 506 to generate call 524. Call 524 is a telephone call that connects authentication management process 510 and mobile device 508 in this illustrative embodiment. For example, call 524 may be generated by a modem or other suitable communication device associated with computer system 502. Mobile device 508 answers call 524 to connect to computer system 502 using telephone network 506. In these illustrative examples, mobile device 508 does not present an indication visible to the user that call 524 is received or connected. In other illustrative embodiments, mobile device 508 does not present the indication only when call 524 is identified by mobile device 508 as being from authentication management process 510. For example, mobile device 508 may only identify call 524 as being from authentication management process 510 when caller identification information for call 524 includes a phone number associated with authentication management process 510 in a data source accessible to mobile device 508.

Once call 524 is connected, mobile device 508 transmits plurality of dual-tone multi-frequency tones 526 in the event that single use key 514 included plurality of numbers 516. In such an illustrative embodiment, plurality of dual-tone multi-frequency tones 526 is a collection of dual-tone multi-frequency tones that correspond to plurality of numbers 516. In other words, mobile device 508 generates plurality of dual-tone multi-frequency tones 526 where each tone in plurality of dual-tone multi-frequency tones 526 is the tone that represents a number in plurality of numbers 516. In an illustrative embodiment in which single use key 514 includes plurality of audio tones 518, mobile device 508 instead generates plurality of audio tones 518 in call 524 such that plurality of audio tones 518 are received by authentication management process 510.

Authentication management process 510 receives plurality of dual-tone multi-frequency tones 526 and/or plurality of audio tones 518 from mobile device 508 and determines whether plurality of dual-tone multi-frequency tones 526 and/or plurality of audio tones 518 are the same as plurality of numbers 516 and/or plurality of audio tones 518 sent to mobile device 508 using Internet protocol network 504. In the event that plurality of dual-tone multi-frequency tones 526 and/or plurality of audio tones 518 are the same as plurality of numbers 516 and/or plurality of audio tones 518 sent to mobile device 508, authentication management process 510 determines that mobile device 508 is authenticated. Thus, authentication management process 510 allows mobile device 508 to access the cloud application.

Figure 6:
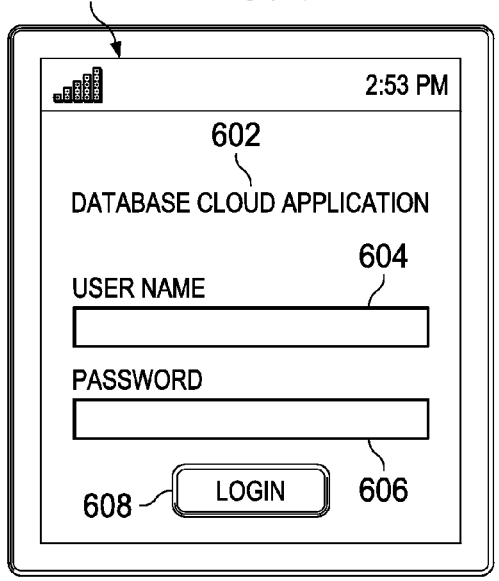
FIG. 6 is an illustration of a screenshot of a login screen in accordance with an illustrative embodiment.

Turning now to FIG. 6, an illustration of a screenshot of a login screen is depicted in accordance with an illustrative embodiment. Screenshot 600 is an example of a user interface that may be generated and displayed by mobile device 408 in FIG. 4.

In this illustrative embodiment, the user interface in screenshot 600 is displayed by a mobile device when a user attempts to access a cloud application. In this example, the user desires to access database cloud application 602. In some illustrative embodiments, the user has login credentials issued to the user for accessing the cloud application. In these illustrative examples, the user enters a user name in field 604 and a password in field 606. Once the user has entered the login credentials, the user activates button 608.

The mobile device then generates an authentication request, such as authentication request 420 in FIG. 4. Authentication request 420 contains the user name and password in this illustrative embodiment. Of course, in some illustrative examples, the user name and password are protected and/or encrypted to prevent the credentials from being received by an unauthorized party.

The mobile device sends the authentication request to an authentication management process, such as authentication management process 412 in FIG. 4. The mobile device may then initiate a call across a telephone network to the authentication management process to a phone number and within a selected period of time received from the authentication management process, as depicted with respect to mobile device 408 in FIG. 4. In other illustrative embodiments, the mobile device waits for the authentication management process to initiate a telephone call across a telephone network, as depicted with respect to mobile device 508 in FIG. 5. It should be noted that, in these examples, the mobile device does not indicate to the user that the telephone call is being initiated or received.

The mobile device then provides a single use key to the authentication management process that was received in the response to the authentication request. In the event that the single use key is incorrect and/or the amount of time has expired, the authentication management process denies the request. In the event that the single use key is correct and the amount of time has not expired, the authentication management process grants the mobile device access to the cloud application as shown in screenshot 700 in FIG. 7.

Figure 7:
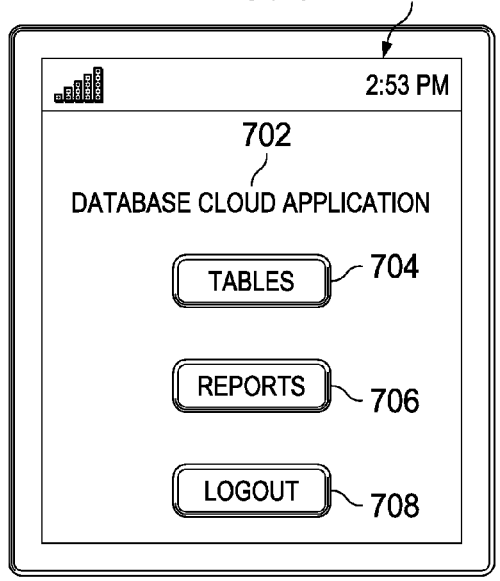
FIG. 7 is an illustration of a screenshot of a cloud application in accordance with an illustrative embodiment.

Looking now to FIG. 7, an illustration of a screenshot of a cloud application is depicted in accordance with an illustrative embodiment. Screenshot 700 is an example of a user interface that may be generated and displayed by mobile device 408 in FIG. 4.

In screenshot 700, the mobile device has been granted access to database cloud application 702. In this illustrative example, database cloud application 702 is a database application. Screenshot 700 presents buttons 704, 706, and 708. Activating button 704 displays a number of tables in a database that may be accessed by the user using the mobile device. Activating button 706 displays a number of reports that may be accessed by the user using the mobile device. Of course, the user may not have access to the same tables and/or reports that the user has access to on another device. In other words, the number of tables and/or reports may be different based on the device being used by the user to access database cloud application 702.

Figure 8:
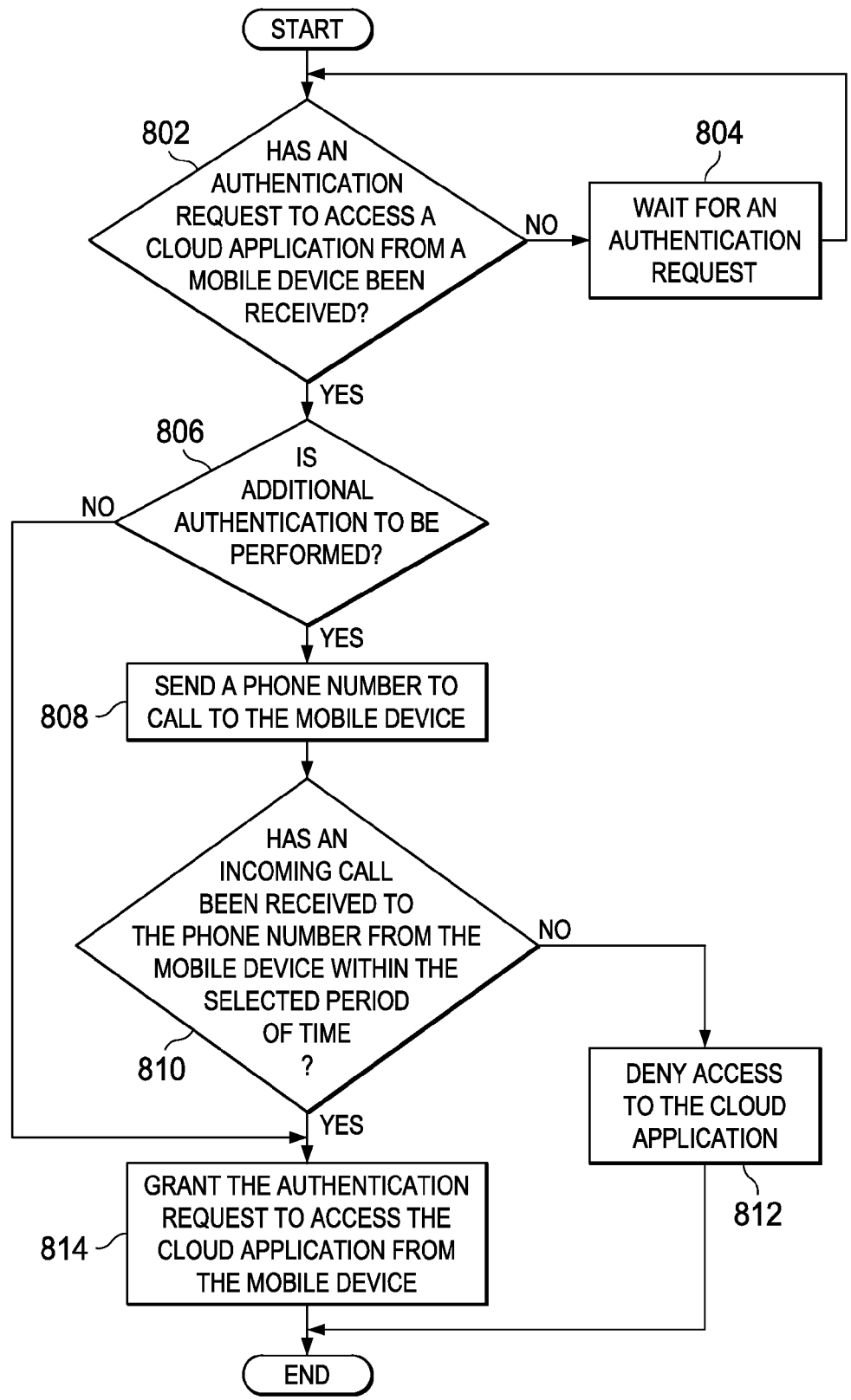
FIG. 8 is an illustration of a flowchart of a process for managing an authentication request in accordance with an illustrative embodiment.

Turning now to FIG. 8, an illustration of a flowchart of a process for managing an authentication request is depicted in accordance with an illustrative embodiment. The process may be performed by authentication management process 412 running in computer system 402 in FIG. 4.

The process begins by determining whether an authentication request to access the cloud application from a mobile device has been received (step 802). The authentication request may be authentication request 420, and the mobile device may be mobile device 408 in FIG. 4. If the process determines that an authentication request to access a cloud application from the mobile device has not been received, the process waits for an authentication request (step 804).

If the process determines that an authentication request to access the cloud application from the mobile device has been received, the process determines whether additional authentication is to be performed (step 806). The additional authentication may be an example of additional authentication 422 in FIG. 4. A policy may be used to determine whether additional authentication is to be performed. For example, the policy may indicate that additional authentication is to be performed when the mobile device has not been authenticated within a predetermined period of time, the user has not previously logged in from the mobile device, or other suitable criteria. If the process determines that additional authentication is not to be performed, the process proceeds to step 814.

If the process determines that additional authentication is to be performed, the process sends a phone number to call to the mobile device (step 808). In some illustrative embodiments, the selected period of time is included in the response. The process then determines whether an incoming call has been received to the phone number from the mobile device within the selected period of time (step 810). If the process determines that the incoming call has not been received to the phone number from the mobile device within the selected period of time, the process denies access to the cloud application (step 812). The process terminates thereafter.

If the process determines that an incoming call has been received to the phone number from the mobile device within the selected period of time at step 810, the process grants the authentication request to access the cloud application from the mobile device (step 814). The process terminates thereafter.

Figure 9:
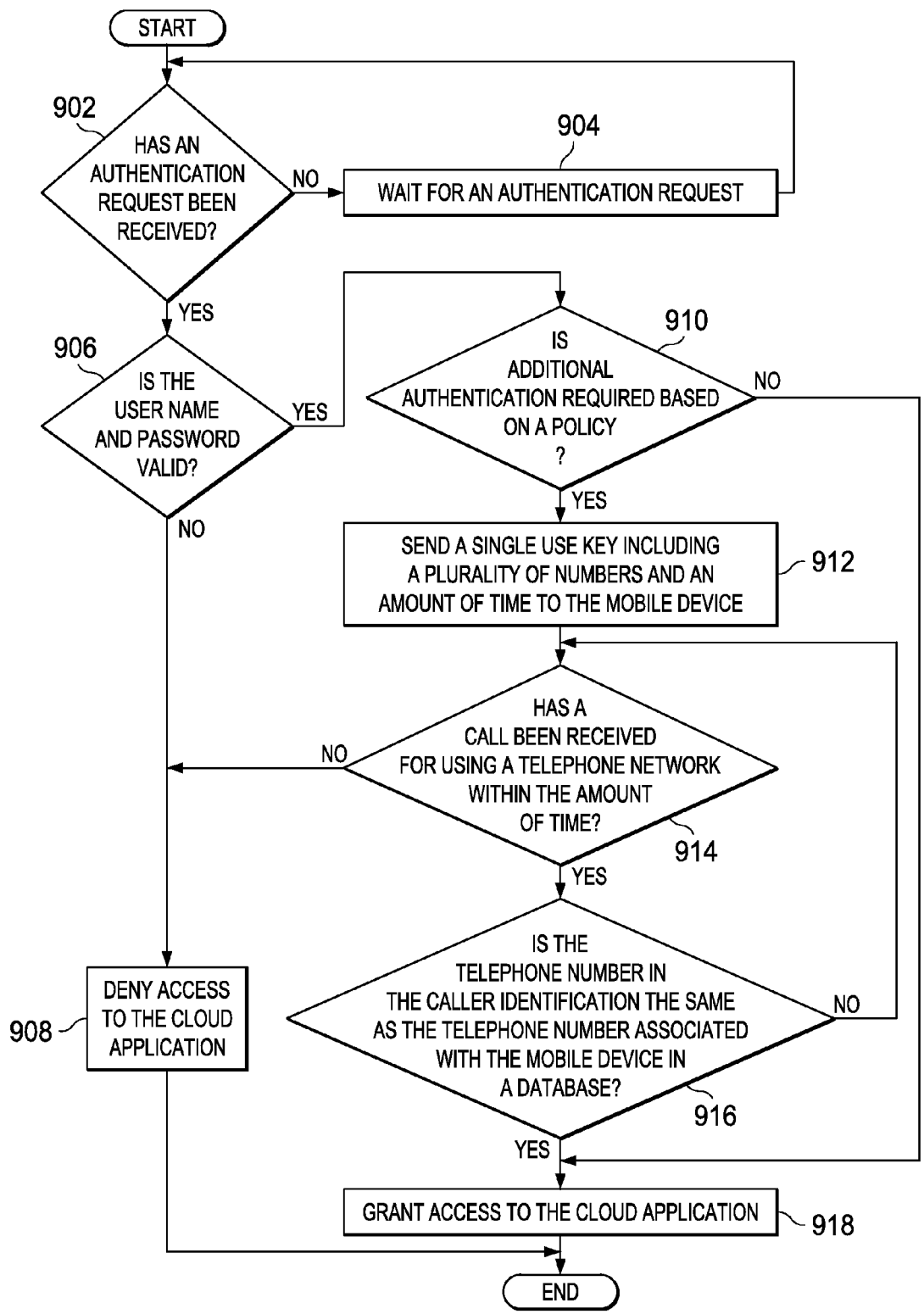
FIG. 9 is an illustration of a flowchart of a process for authenticating a mobile device in accordance with an illustrative embodiment.

With reference now to FIG. 9, an illustration of a flowchart of a process for authenticating a mobile device is depicted in accordance with an illustrative embodiment. The process may be performed by authentication management process 412 running in computer system 402 in FIG. 4.

The process begins by determining whether an authentication request has been received (step 902). If the process determines that an authentication request has not been received, the process waits for an authentication request (step 904). The process then returns to step 902. If the process determines that an authentication request has been received, the process determines whether the user name and password are valid (step 906). The process may use a database of user name and password information to determine whether the user name and password are valid. If the process determines that the user name and password are not valid, the process denies access to the cloud application (step 908). The process terminates thereafter.

If the process determines that the user name and password are valid at step 906, the process determines whether additional authentication is required based on a policy (step 910). If the process determines that additional authentication is not required based on the policy, the process proceeds to step 918. If the process determines that additional authentication is required based on the policy at step 910, the process sends a single use key including a plurality of numbers and an amount of time to the mobile device (step 912). The single use key is an example of single use key 425 in FIG. 4.

The process then determines whether a call has been received for using a telephone network within the amount of time (step 914). If the process determines that a call has not been received using a telephone network within the amount of time, the process goes to step 908. If the process determines at step 914 that a call has been received using a telephone network within the amount of time, the process determines whether the telephone number in the caller identification is the same as the telephone number associated with the mobile device in a database (step 916). If the process determines that the telephone number in the caller identification is not the same as the telephone number associated with the mobile device, the process returns to step 914. If the process determines that the telephone number in the caller identification is the same as the telephone number associated with the mobile device, the process grants access to the cloud application (step 918). The process terminates thereafter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For example, the process may call the mobile device at the number in the database instead of performing operation 914 in FIG. 9. The process then waits for the mobile device to send the single use key across the telephone network during the call. The process waits a predetermined amount of time for the mobile device to send the single use key. If the predetermined amount of time elapses, the process terminates the call and denies access to the cloud application.

The different illustrative embodiments allow an operator of a cloud application to verify the identity of a mobile device being used by a user who desires to access the cloud application. The user of the cloud application may not be aware that the additional authentication is taking place. In other words, the mobile device may send the authentication request, receive a response, initiate a telephone call, receive a telephone call, and/or send a single use key without the knowledge and/or interaction of the user.

Additionally, in the event that the login credentials of the user are disclosed to an unauthorized party, the different illustrative embodiments prevent an unauthorized device from accessing the cloud application because the unauthorized party is unlikely to have the mobile device of the user and the login credentials of the user. By using a telephone network to verify the identity of the mobile device, the different illustrative embodiments are not limited to particular hardware or software implementations.

Thus, the different illustrative embodiments provide a method, computer program product, and apparatus for managing an authentication request. A determination is made whether additional authentication is to be performed responsive to receiving the authentication request to access an application from a mobile device. A phone number to call is sent to the mobile device responsive to a determination that the additional authentication is to be performed. A determination is made whether an incoming call to the phone number is from the mobile device and within the selected period of time. The authentication request to access the application from the mobile device is granted responsive to a determination that the incoming call to the phone number is from the mobile device and within the selected period of time.

What is claimed is:

1. A method of managing an authentication request comprising:
responsive to receiving the authentication request to access an application from a mobile device, determining whether additional authentication is to be performed using a policy, wherein the policy comprises criteria for determining whether the additional authentication is to be performed;
responsive to a determination that the additional authentication is to be performed, sending a phone number to call to the mobile device;
determining whether an incoming call to the phone number is from the mobile device and within a selected period of time; and
responsive to a determination that the incoming call to the phone number is from the mobile device and within the selected period of time, granting the authentication request to access the application from the mobile device, wherein the granting of the authentication request to access the application is for a limited period of time, wherein the authentication request is a first authentication request, the phone number is a first phone number, the selected period of time is a first selected period of time, the incoming call is a first incoming call, and wherein the first phone number is in a plurality of phone numbers, and further comprising:
responsive to expiration of the limited period of time, sending a message to the mobile device that further authentication is required;
responsive to receiving a second authentication request and a determination that the additional authentication is to be performed using the policy, sending a second phone number in the plurality of phone numbers to the mobile device; and
determining whether a second incoming call is received from the mobile device at the second phone number and the second incoming call is received within a second selected period of time.

2. The method of claim 1, wherein determining whether the incoming call to the phone number is from the mobile device and within the selected period of time comprises:
determining whether a caller identification of the incoming call corresponds to the phone number associated with the mobile device in a data structure and whether the incoming call was received within the selected period of time.

3. The method of claim 1, wherein the phone number is a first phone number and wherein sending the first phone number to call to the mobile device comprises:
sending the first phone number, the selected period of time in which to call the first phone number and a single use key to the mobile device.

4. The method of claim 3, wherein the single use key is a plurality of numbers, and wherein determining whether the incoming call to the phone number is from the mobile device and within the selected period of time comprises:

determining whether a caller identification of the incoming call corresponds to a second phone number associated with the mobile device in a data structure; and
responsive to a determination that the caller identification of the incoming call corresponds to the second phone number associated with the mobile device in the data structure, determining whether the single use key is received as a plurality of dual-tone multi-frequency signals corresponding to the plurality of numbers.

5. The method of claim 3, wherein the single use key is information about a plurality of audio tones, and wherein determining whether the incoming call to the phone number is from the mobile device and within the selected period of time comprises:
determining whether a caller identification of the incoming call corresponds to a second phone number associated with the mobile device in a data structure; and
responsive to a determination that the caller identification of the incoming call corresponds to the second phone number associated with the mobile device in the data structure, determining whether the single use key is received as the plurality of audio tones.

6. The method of claim 1, wherein the incoming call is received over a telephone network.

7. A method of managing an authentication request comprising:
responsive to receiving the authentication request to access an application from a mobile device, determining whether additional authentication is to be performed using a policy, wherein the policy comprises criteria for determining whether the additional authentication is to be performed;
responsive to a determination that the additional authentication is to be performed, sending a single use key to the mobile device using an internet protocol network;
calling the mobile device at a phone number associated with the mobile device in a data source to form a call;
determining whether the mobile device provides the single use key during the call; and
responsive to a determination that the mobile device provides the single use key during the call, granting the authentication request to access the application from the mobile device, wherein the granting of the authentication request to access the application is for a limited period of time, wherein the authentication request is a first authentication request, the phone number is a first phone number, the selected period of time is a first selected period of time, the incoming call is a first incoming call, and wherein the first phone number is in a plurality of phone numbers, and further comprising:
responsive to expiration of the limited period of time, sending a message to the mobile device that further authentication is required;
responsive to receiving a second authentication request and a determination that the additional authentication is to be performed using the policy, sending a second phone number in the plurality of phone numbers to the mobile device; and
determining whether a second incoming call is received from the mobile device at the second phone number and the second incoming call is received within a second selected period of time.

8. The method of claim 7, wherein the single use key is a plurality of numbers, and wherein determining whether the mobile device provides the single use key during the call comprises:

determining whether the mobile device generates a plurality of dual-tone multi-frequency tones that correspond to the plurality of numbers.

9. The method of claim 7, wherein the single use key is information about a plurality of audio tones, and wherein determining whether the mobile device provides the single use key during the call comprises:
determining whether the mobile device generates the plurality of audio tones during the call.

10. The method of claim 7, wherein the application is a cloud application.

11. The method of claim 8, wherein the criteria specifies that the additional authentication is to be performed when the mobile device has not previously accessed the application.

12. The method of claim 7, wherein the criteria specifies that the additional authentication is to be performed when login credentials are incorrectly entered more than a threshold number of times.

13. The method of claim 1, wherein the criteria specifies that the additional authentication is to be performed when the mobile device has not previously accessed the application.

14. The method of claim 1, wherein the criteria specifies that the additional authentication is to be performed when login credentials are incorrectly entered more than a threshold number of times.

15. The method of claim 1, further comprising:
sending a key to the mobile device that indicates the mobile device has been granted access to the application.

* * * * *